Jan. 14, 1964     R. F. BILLIS     3,117,384
MANIPULATABLE TEACHING AID
Filed March 14, 1962
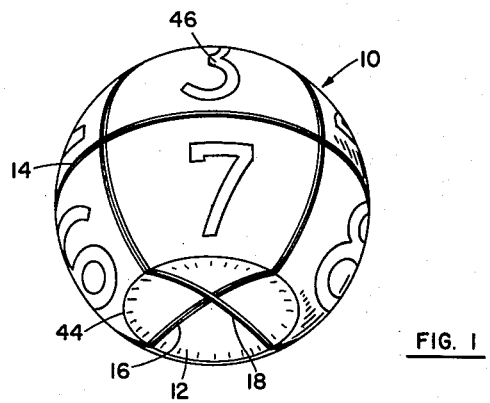
FIG. 1
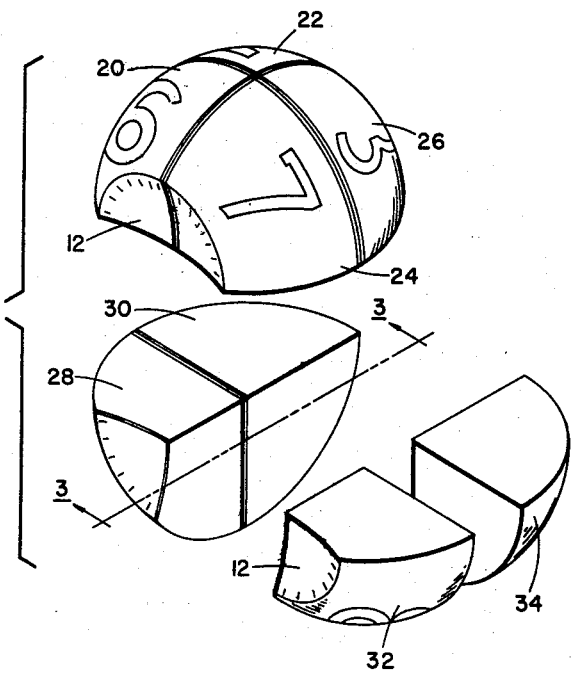
FIG. 2
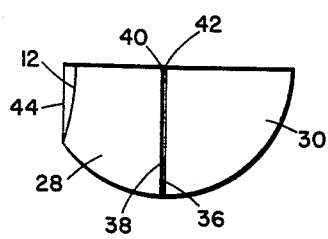
FIG. 3
*INVENTOR.*
ROMAN F. BILLIS
BY
ATTORNEY

United States Patent Office 3,117,384
Patented Jan. 14, 1964

3,117,384
MANIPULATABLE TEACHING AID
Roman F. Billis, 552 Via Delmonte,
Palos Verdes Estates, Calif.
Filed Mar. 14, 1962, Ser. No. 179,585
2 Claims. (Cl. 35—73)

This invention concerns an article useful both as a toy and as a teaching aid to amuse and excite the interest of children by appealing to their natural liking for disassembly and reassembly of objects, whereby manipulation of the article for the sake of amusement results in subconscious learning by the manipulator. More particularly, the invention contemplates a segmented body of appealing geometrical shape having its individual segments releasably but firmly held together.

Visual aids such as a segmented article which may be disassembled into fractional portions and reassembled to form a unified whole have been used in the past for teaching arithmetic, especially fractions. However, devices of this type known to the prior art are generally ineffective and impractical for actual use because they are poorly adapted to their purpose. Some of the stated devices, for example, require relatively great manipulative skill or manual dexterity in their disassembly or assembly operations and thus are better suited to adult skills than those normally occurring in elementary school classes. Therefore use of such devices is necessarily limited to demonstrative exercises by the adult teacher, and the characteristically short span of attention in elementary school classes is not as effectively overcome by use of visual aids in the stated manner as when the devices are handled by each individual pupil in the class. Other teaching aids known in the prior art which may be functionally better suited for use by grammar school age groups than the foregoing type are poorly adapted to their purpose because of their materials of construction, their appearance, their shape, their failure to appeal to the sense of touch or their difficulty of manipulatability.

Accordingly, it is a principal object of the invention in this case to provide a teaching aid characterized by improved ease of manipulatability.

It is a further object in this case to provide segmented articles of various geometrical shapes having means of improved effectiveness for securely and releasably holding the stated segments in close juxtaposition to form such shapes.

It is another object of this invention to provide an article as set forth in the above objects characterized by improved economy and facility of manufacture.

Other important objects and advantages of the instant invention will become apparent upon a close reading of the following detailed description of the invention, reference being had to the accompanying drawing, wherein:

FIGURE 1 shows an overall perspective view of an article formed in accordance with the inventive principles taught herein, FIGURE 2 shows a general perspective view of the article of FIGURE 1 in the partially disassembled condition, and FIGURE 3 shows a side elevational view of a portion of the article shown in FIGURES 1 and 2.

With reference to the drawing as described above, and particularly to FIGURE 1, it may be seen that this invention contemplates an article of appealing or symmetrical shape such as the ball indicated generally by reference numeral 10. Ball 10 may be substantially spherical over its entire external surface except for a relatively small area 12 which is concave or dish shaped for a purpose subsequently disclosed herein. In addition, ball 10 is divided into segments or component portions by a plurality of imaginary planes as shown by lines 14, 16 and 18 which define the stated planes of separation and also denote the areas of contact between confronting surfaces of the various segments.

The segments or portions of ball 10 resulting from its division along the planes of separation indicated by lines 14, 16 and 18 shown in FIGURE 1 may be seen from FIGURE 2 and are evenly numbered from 20 to 34, inclusive. In FIGURE 2, ball 10 is shown partially disassembled whereby half of the ball is composed of portions 20 to 26, another one-fourth of ball 10 is composed of portions 28 and 30, and the remainder of ball 10 consists of portions 32 and 34 shown separated from each other. Thus, considering all of the portions as forming a sphere when assembled, it will be seen that the volume of each stated portion comprises one-eighth of the total volume of ball 10, and that the assembly of any two adjacent portions in contacting relationship with each other comprises one-fourth of the total volume of ball 10. Accordingly, it may be seen that a verbal explanation of the relationship between an entire unit and any portion thereof in teaching fractions may be advantageously accompanied by a visual demonstration of such relationship as accomplished by removing one-eighth, one-fourth, or one-half of ball 10 from the remaining segments thereof.

It is also an essential feature of the inventive concept disclosed herein that ball 10 is adapted to be thrown short distances such as required in games of "catch," but is not so hard or heavy that it could inflict injury if thrown against a person's head or body. To this end, it is important that ball 10 be formed of lightweight material having optimum mass and strength for the stated use, and that effective holding means be provided for holding together the confronting surfaces of portions 20 to 34 securely but releasably. Accordingly, ball 10 is advantageously fabricated from balsa or a lightweight plastic such as foamed polystyrene or the like, which may be either initially formed in a die oppositely corresponding to the overall external shape of ball 10, or may be cast or formed in block from and thereafter cut or otherwise shaped as desired. Holding means in the form of synthetic resin sheets or patches such as taught in U.S. Patent No. 3,009,235, issued November 21, 1961, are then adhesively joined to the confronting surfaces of portions 20 to 34 in permanently affixed relationship. Thus, for example, surface 36 on portion 28 may have adhesively joined thereto a sheet or patch 40 of nylon material as taught in the stated patent having a multitude of minute hooks adapted to engage a plurality of loops in a closed loop pile plastic or fabric material and unite closely and firmly therewith. Surface 38 on portion 30 may have adhesively joined thereto a sheet or patch 42 of closed loop pile material of the type mentioned. When patches 40 and 42 are brought into close or substantially uniform contact, the stated materials affixed to each of the surfaces will cause portions 28 and 30 to hold firmly together until forcibly separated by the application of external force.

Since the holding means used to unite together the individual portions 20 to 34 in ball 10 as disclosed above require substantial force to separate the components from each other or from the completely assembled ball, concave or dish shaped area 12 is provided as shown in FIGURE 1, for example, to permit application of the necessary force. Thus, it will be understood that ball 10 may be held generally between the two hands with the thumbtips situated within area 12 and the fingers pressing against ball 10 on the external surface thereof opposite from area 12. With ball 10 thus supported, considerable pressure may be applied by the thumbs in two opposite directions radially outwardly against the concave surfaces of area 12 or any portion of such surfaces, and any of the portions 20, 24, 28 or 32, or any pair of these, either with or without the various portions 22, 26, 30 or 34 respectively adjoined thereto, may be removed from ball 10. When it is desired to replace any portion of ball 10 thus removed, the portion or portions are merely pressed into proper contacting relationship with the remaining portions of ball 10 and the holding means described above is operatively engaged immediately upon close contact of the confronting patches such as 40 and 42, for example. It is also a function of area 12 to provide stable base means for ball 10 when in the assembled condition. Thus, it may be seen that the peripheral edge 44 formed by intersection of the concave surface of area 12 with the convex surface of ball 10 is a circle defining a plane. When edge 44 is placed in contact with a table top, for example, ball 10 will remain at rest thereon without rolling off.

From the description set forth above, it may be seen that the invention disclosed herein provides an article adapted for diverse uses or functions, such as a kindergarten toy, a ball for older children's games, and a teaching aid for instruction of arithmetic. The device thus taught is particularly well suited as a teaching aid in that its manipulation involves elementary manual skill such as well within the skills of children even in lower school grades whereby individual pupils may assemble or disassemble the article for themselves rather than merely try to fix their attention on a demonstration by someone else. In addition, appropriate indicia such as numerals as indicated at 46 may be permanently formed on each of the component portions of ball 10, thus aiding in the development of recognition of numerals by beginning arithmetic pupils. The holding action occurring between confronting surfaces of the individual portions 20 to 34 is sufficiently strong due to the nylon material discussed above to permit removal of any portion or group of portions from ball 10 by the technique set forth above without the remaining portions of ball 10 flying apart or dropping out of the hands during manipulation of the device. Moreover, the materials of construction disclosed herein are nontoxic, splinter-free and otherwise safe for use by small children, in addition to which their textures and colors are appealing to the touch and sight, respectively. In connection with its use as a throwing toy, it is characteristic of the structure herein disclosed that the holding means between confronting surfaces of portions 20 to 34 provides improved reliability in securely holding together the stated portions of ball 10, while also permitting quick and positive release of the portions when desired. Thus, the component portions of ball 10 will not loosen or separate in spite of shock, vibrations or random external forces, but only in response to oppositely directed forces deliberately applied within area 12 in the manner described above. It may further be understood from the teachings set forth above that the inventive concept in this case is not limited to spheres as discussed illustratively in connection with ball 10, but includes other bodies of diverse geometrical shape such as tetrahedrons, cubes, pyramids, or shapes identified with various fruits, vegetables or other objects appropriately colored and textured.

While the particular details set forth above and in the drawing are fully capable of attaining the objects and providing the advantages herein stated, the structure thus disclosed is merely illustrative and could be varied or modified to produce the same result without departing from the scope of the inventive concept as defined in the appended claims.

I claim:

1. An article for teaching arithmetic comprising a solid of substantially spherical shape divided into separable portions having confronting planar surfaces in close juxtaposition when assembled to form said shape, said surfaces having sheet material affixed thereon for releasably holding said portions in secure cooperating relationship when assembled to form said solid, said material comprising a plurality of minute hooks and loops adapted to operatively engage each other and remain thus engaged until separated by substantial external force applied to said portions, said separable portions being defined by at least one plane of separation passing through the geometric center of said solid, and an indented area in the external surface of said solid, said plane passing through said area so that generally opposing forces applied to said area in a direction generally away from said plane and on opposite sides thereof cause separation of said portions from each other whereby said solid is disassembled.

2. The structure set forth in claim 1 above wherein said indented area forms a generally dish shaped depression, the surface of which forms an edge at the intersection thereof with the external surface of said solid adjacent said area, said edge defining a plane whereby said solid is restrained from rolling when in the assembled state and placed on a generally flat surface with said edge in contact with said flat surface throughout the length of said edge.

References Cited in the file of this patent

UNITED STATES PATENTS

| | | |
|---|---|---|
| 267,402 | Bynon | Nov. 14, 1882 |
| 2,694,574 | Baker | Nov. 16, 1954 |
| 2,839,841 | Berry | June 24, 1958 |
| 3,009,235 | De Mestral | Nov. 21, 1961 |